Sept. 23, 1952          A. C. ALBEE          2,611,284
FILM REEL DRIVE
Filed Feb. 16, 1951          2 SHEETS—SHEET 1
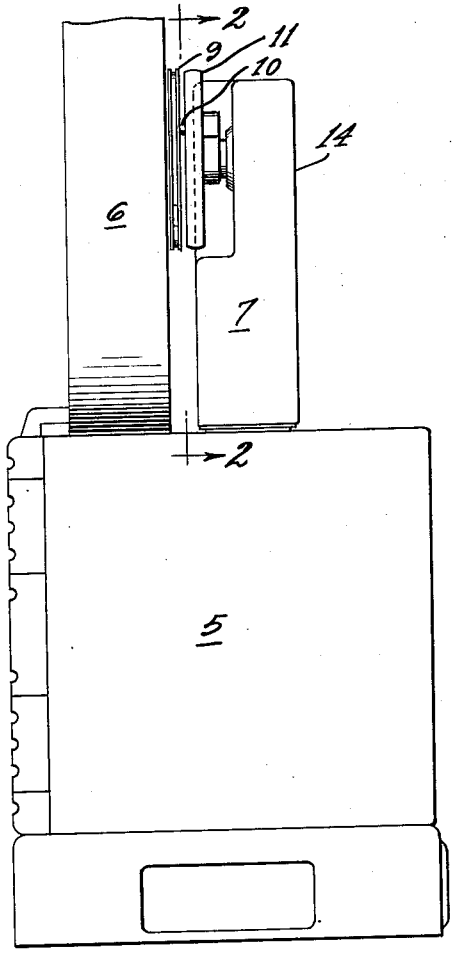
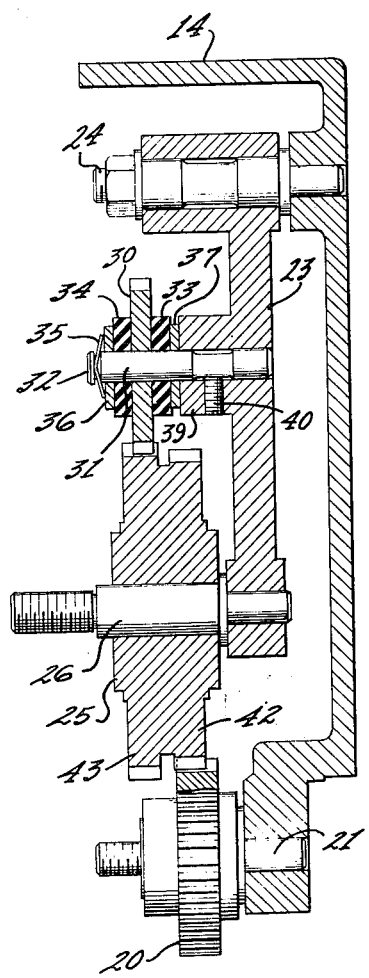
INVENTOR.
Arthur C. Albee
BY
ATTORNEY.

INVENTOR.
Arthur C. Albee

Patented Sept. 23, 1952

2,611,284

UNITED STATES PATENT OFFICE 2,611,284

FILM REEL DRIVE

Arthur C. Albee, Hollywood, Calif., assignor to Radio Corporation of America, a corporation of Delaware Application February 16, 1951, Serial No. 211,252

6 Claims. (Cl. 74—665)

This invention relates to motion picture film apparatus, and particularly to a film magazine drive whereby the film is wound on a take-up reel after passage through a particular film equipment.

The general principle embodied in the magazine or take-up reel drive presented in the present invention is disclosed in Collins co-pending U. S. application, Ser. No. 739,512, filed April 4, 1947, and also in U. S. Patent No. 2,275,497 of March 10, 1942. Both the patent and the application discloses a take-up reel drive whereby either the normal supply reel or normal take-up reel may be positively driven to take up film through a series of gears either equal or unequal in number, the driving gear being connected to either series by the direction of rotation of the film advancing mechanism.

The present invention improves upon this type of reel drive to provide, in addition to the automatic shifting of the drive from one reel to the other, a positive and proper meshing of the drive gear with the driven gears, and a positive shifting action, which not only rapidly shifts the drive gear, but maintains the gears in mesh during the winding operation and under variations in the load thereon. The first feature is accomplished by a novel pivoted T-shaped structure provided with adjustable stops, while the second feature is accomplished by introducing a drag or tension on one side of the shiftable gear.

The principal object of the invention, therefore, is to facilitate the driving of take-up reel spindles.

Another feature of the invention is to provide an improved take-up reel spindle drive mechanism.

A further object of the invention is to provide a quick acting automatic gear shift which maintains the meshing gears in mesh in the correct amount, regardless of the variation in energy being transferred by the gears.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an end view of a sound recorder with which the invention is associated.

Fig. 3 is a cross-sectional view of the invention taken along the line 3—3 of Fig. 2.

Figure 2:
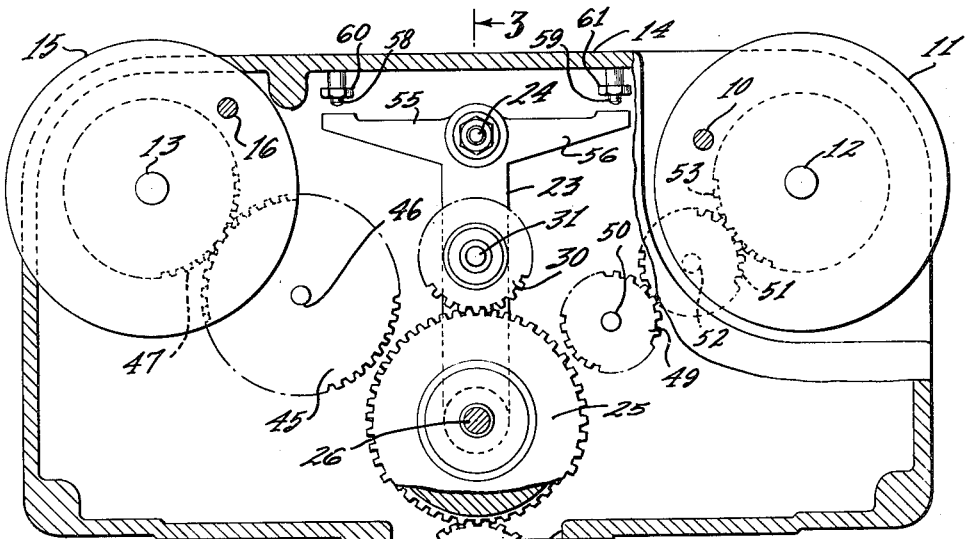
Fig. 2 is a front view of the film drive mechanism embodying the invention and taken along the line 2—2 of Fig. 1.

Referring now to the drawings, in which the same numerals identify like elements, a sound recorder 5, of any standard type such as the recorder shown in the above mentioned co-pending application, has mounted thereon a film magazine 6 and a film reel spindle drive mechanism unit 7 embodying the invention. The magazine 6 is shown with a pulley 9 which may be grooved to accommodate a belt for rotating the pulley and which is provided with a series of holes in which a pin 10 on a disc 11 may be inserted. The disc 11 is mounted on a shaft 12, as shown in Fig. 2, a similar shaft 13 extending through the other end of the housing 14, on which is a disc 15 similar to disc 11 and having a drive pin 16. The lower end of the casing 14 has an opening 19 therein through which extends a gear 20 on a shaft 21 and rotated by the film advancing mechanism.

Mounted on a T-shaped arm 23 pivoted on a pivot shaft 24, is a large double drive gear 25 mounted for rotation on a shaft 26. The gear 25 is in mesh at all times with the gear 20. Above the gear 25, and also in mesh therewith at all times, is a gear 30 rotatable on a shaft 31 mounted on the bracket 23. As shown in Fig. 3, the gear 30 has its sides in contact with fraction washers 33 and 34, the pressure between the washers and the gear being determined by a spring 35 held on the shaft 31 by a screw 32. The spring 35 and washer 34 are separated by a bearing collar 36, a similar collar 37 being positioned between the washer 33 and the end of a boss 39 on the bracket 23. The shaft 31 is held in fixed position by a set screw 40. As shown in Fig. 3, the double gear 25 has a right-hand section 42 which is in mesh with the gear 20, and a left-hand section 43 in mesh with the gear 30.

Figure 4:
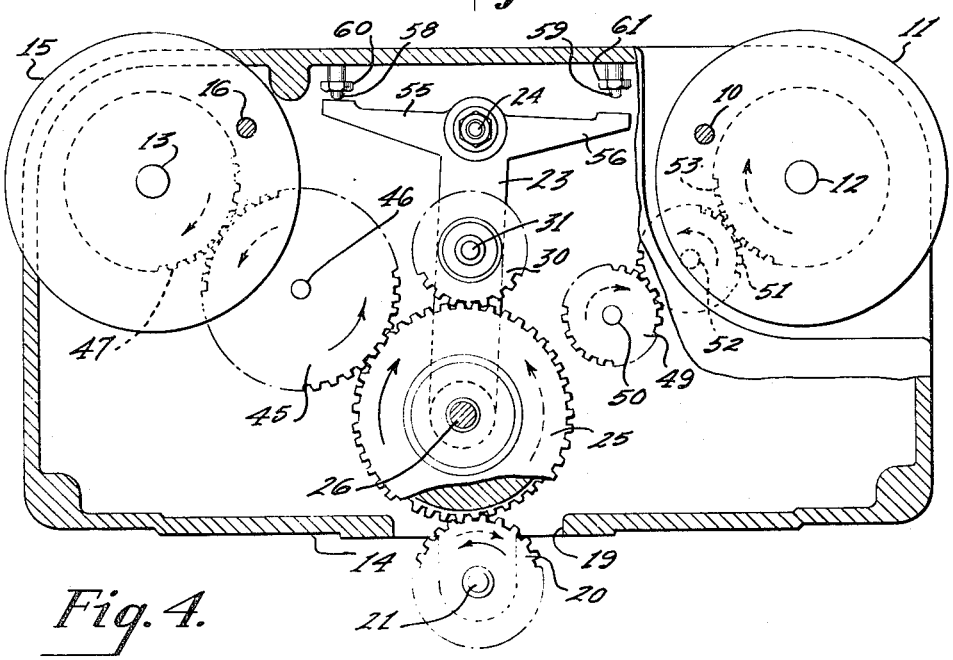
Fig. 4 is a view similar to Fig. 2 showing one driven gear in mesh with the drive gear.

The action of the series of gears 20, 25, and 30 is that rotation of the gear 20 in one direction, such as shown by the solid line arrow in Fig. 4, will move the lower end of the bracket 23 to the left carrying with it the gear 25, so that it will mesh with a gear 45 rotatable on a shaft 46 and which is permanently in mesh with a gear 47 on the driving disc shaft 13. The respective directions of these gears are indicated by the other solid line arrows. Rotation of the gear 20 in the opposite direction to that shown in Fig. 4 will bring gear 25 in mesh with a gear 49 rotatable on a shaft 50, gear 49 being permanently in mesh with a gear 51 rotatable on a shaft 52, while gear 51 is permanently in mesh with a gear 53 mounted on the shaft 12 of disc 11. The meshing of gear 25 with gear 49 is obtained when gear 20 is rotated in the direction shown by the dotted line arrow thereon, the other gears being rotated in the directions shown by the other dotted line arrows.

This shifting of the gear 25 between the gears 45 and 49 has been accomplished in the past simply by mounting the gear 25 on the end of an arm pivoted at 24. Although the transfer of gear 25 was accomplished in this manner, there was some lost motion therein, and during different loads on the gear caused by an increase in the film roll diameter on the take-up reel, there was occasional disengagement of the gear 25 with its driven gear. The driving gear 25 would also "bounce" off the gears 45 and 49 at times. However, by placing a drag on the upper portion of the gear 25 by the gear 30 rotating against the friction of the discs 33 and 34, the changeover was rapidly and positively accomplished upon rotation of the gear 20 and the mesh between gear 25 and its driven gear was maintained at all times regardless of load.

Another feature of the mechanism is in the form or type of the arm 23 which has the extending portions 55 and 56. These portions have contact surfaces at the ends thereof adapted to contact stop screws 58 and 59 adjustable with respect to the ends 55 and 56 by respective nuts 60 and 61. By providing fixed stops such as just described, the degree of mesh of the driving gear 25 with its respective driven gear remains constant under all loads and cooperates with the holdback or drag gear 30 to insure not only a constant mesh at all times, but also, that the degree of mesh will be proper under all load conditions. There is thus provided an automatic changeover drive from one reel shaft 12 to another reel shaft 13, or vice versa, which will not only be quickly made upon rotation of the gear 20 in either direction, but will provide a constant, accurate, and proper mesh between the drive gear 25 and the gear to be driven thereby at all times under all load conditions.

I claim:

1. A gear drive mechanism adapted to rotate either one of two gears having fixed axes, comprising a pivoted bracket, a drive gear rotatably mounted on the end of said bracket, said gear being shiftable with said bracket between said fixed axis gears, a gear for rotating said shiftable drive gear and constantly in mesh therewith, a second gear mounted on said bracket and constantly in mesh with said shiftable drive gear and rotatably mounted on said bracket, and friction means for maintaining a drag on the rotation of said second gear, said second gear preventing free rotation of said drive gear during the shifting thereof and applying a force to maintain said drive gear in mesh.

2. A gear drive mechanism adapted to rotate either one of two gears having fixed axes, comprising a pivoted bracket, a drive gear rotatably mounted on the end of said bracket, said gear being shiftable with said bracket between said fixed axis gears, a gear for rotating said shiftable drive gear and constantly in mesh therewith, a second gear constantly in mesh with said shiftable drive gear and rotatably mounted on said bracket, friction means for maintaining a drag on the rotation of said second gear, said bracket having extending arms, means being provided for contacting said arms for limiting the angle of movement of said bracket and the amount of shift of said shiftable gear.

3. A gear drive mechanism in accordance with claim 1, in which said friction means includes friction discs in contact with said second gear and resilient means for maintaining a predetermined pressure between said discs and said second gear.

4. A gear drive mechanism comprising a pair of load gears having fixed axial positions, a third gear having a fixed axial position and adapted to be rotated in either direction, a gear having an axis movable to two positions and in mesh with said third gear, said movable axis gear meshing with one of said pair of load gears when in one of said two positions and with the other of said pair of load gears when in the other of said two positions, a bracket on which said movable axis gear is movable, a gear rotatably mounted on said bracket and in mesh with said movable axis gear, and means for placing a drag on the rotation of said last mentioned gear, said last mentioned gear preventing free rotation of said movable axis gear during movement thereof and for applying a force to maintain said movable axis gear in mesh with said load gears.

5. A gear drive mechanism comprising a pair of load gears having fixed axial positions, a third gear having a fixed axial position and adapted to be rotated in either direction, a gear having an axis movable to two positions and in mesh with said third gear, said movable axis gear meshing with one of said pair of load gears when in one of said two positions and with the other of said pair of load gears when in the other of said two positions, a bracket on which said movable axis gear is movable, a gear rotatably mounted on said bracket and in mesh with said movable axis gear, means for placing a drag on the rotation of said last mentioned gear, said bracket being T-shaped, stop means being provided and adapted to contact the ends thereof to determine said two positions of said movable axis gear.

6. A gear drive mechanism in accordance with claim 4, in which last mentioned means includes a friction disc on each side of said last mentioned gear and a spring for providing a predetermined pressure between said last mentioned gear and said discs.

ARTHUR C. ALBEE.

REFERENCES CITED

The following references are of record in the file of this patent:

UNITED STATES PATENTS

| Number | Name | Date |
| --- | --- | --- |
| 1,067,144 | Schilling | July 8, 1913 |
| 1,841,950 | Hinman | Jan. 19, 1932 |
| 2,275,498 | Berndt | Mar. 10, 1942 |